Feb. 23, 1965  F. E. KNECHT  3,170,326
HIGH PRESSURE FLUID LEVEL GAGE
Filed April 24, 1962  2 Sheets-Sheet 1
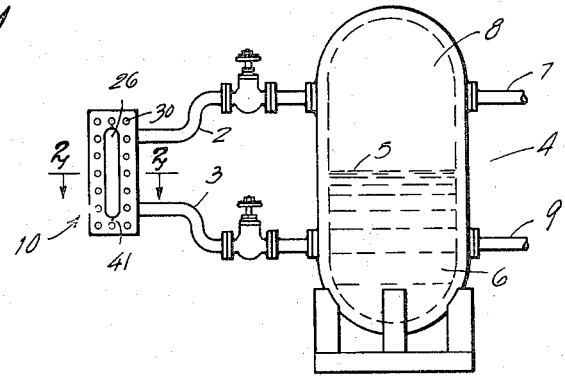
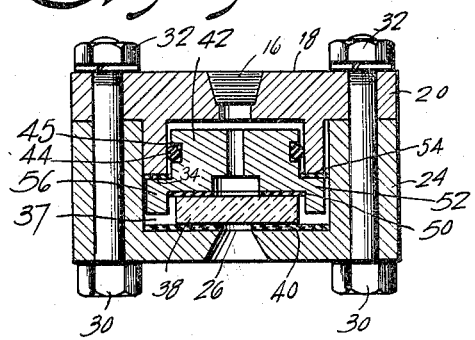
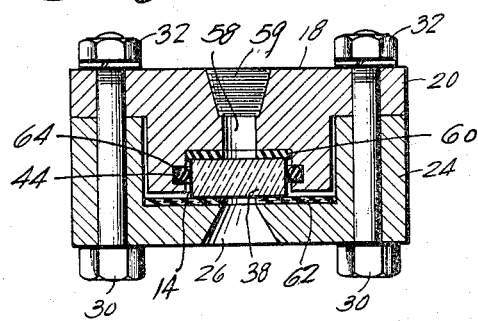
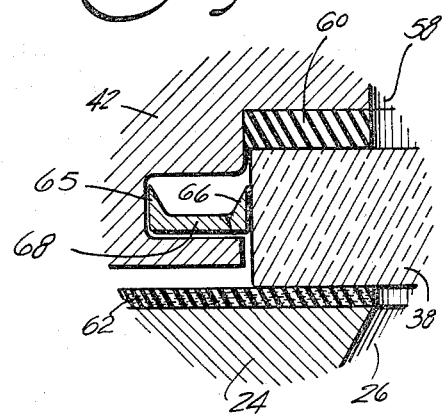
INVENTOR.
Forrest E. Knecht
BY
Arthur L. Collins
Attorney Feb. 23, 1965  F. E. KNECHT  3,170,326
HIGH PRESSURE FLUID LEVEL GAGE
Filed April 24, 1962  2 Sheets-Sheet 2
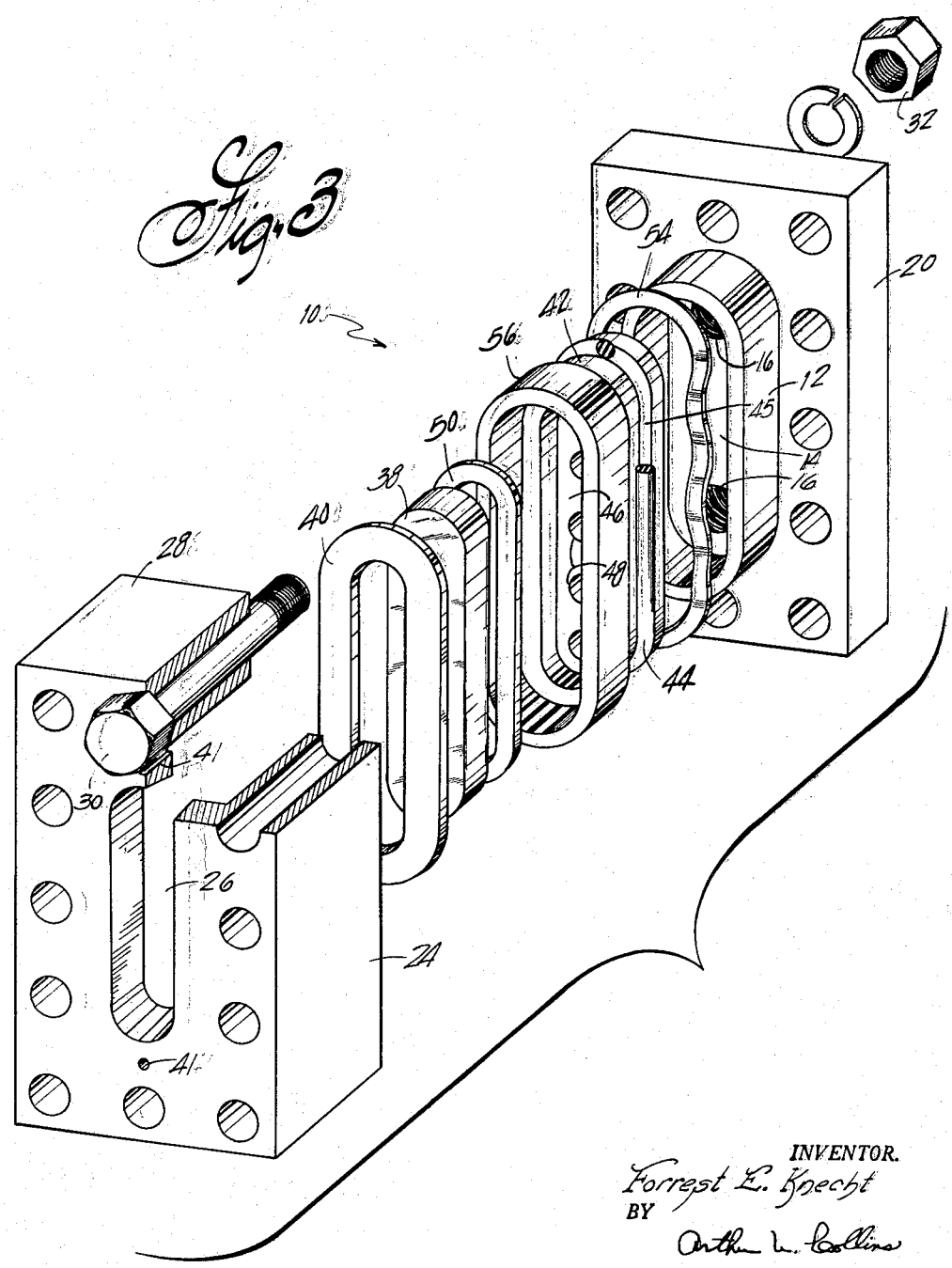
INVENTOR.
Forrest E. Knecht
BY
Arthur L. Collins
Attorney

United States Patent Office 3,170,326
Patented Feb. 23, 1965

3,170,326
HIGH PRESSURE FLUID LEVEL GAGE
Forrest E. Knecht, Newfield, N.J., assignor to the United States of America as represented by the Secretary of the Navy
Filed Apr. 24, 1962, Ser. No. 189,936
6 Claims. (Cl. 73—330)
(Granted under Title 35, U.S. Code (1952), sec. 266)

The invention described herein may be manufactured and used by or for the Government of the United States of America for governmental purposes without the payment of any royalties thereon or therefor.

This invention relates to liquid level gauges particularly for indicating the level of fluids under high pressure.

A common gauge construction used for the same purpose as this invention comprises a two part body enclosing a liquid chamber which is connected to receive the liquid to be measured. A slot in one part of the body covered with a sight glass provides a means of observing the liquid level. The body parts are spaced by a gasket and clamped by bolts passing through them. For 5,000 p.s.i.g. pressures, it has been noted that the bolts had to be torqued to as much as 400 ft.-lbs. to hold the pressure. Even so, after the pressure has been cycled a few times, the bolts had to be re-torqued to eliminate leakage from between the body parts. Furthermore, large bolts and extreme care in assembling the gauge parts is required to avoid deformation and get an even distribution of compression on the gasket.

The present invention provides a gauge construction which avoids these difficulties; it has improved safeguards against leakage that gives a better sealing effect with increased pressures.

The manner in which the invention operates and realizes various objects and advantages will be made clearer in the following description, which is intended to be read with reference to the accompanying drawings, wherein:

FIG. 1 is a diagrammatic view of a tank containing a fluid, the level of which is to be measured by a gauge constructed according to the teachings of the invention.

FIG. 2 is a sectional view taken along the line 2—2 of FIG. 1.

FIG. 3 is a perspective view of the gauge with the parts unassembled and partly broken away.

FIG. 4 is a sectional view similar to FIG. 2 showing a modification.

FIG. 5 is a segment of the view of FIG. 4 showing the utilization of a different pressure responsive gasket.

Referring to the drawing, and especially to FIGS. 1-3, 4 indicates a tank of opaque material containing a liquid 6 with a pressurized gas 8 above it. A gauge 10 is attached to tank 4 by a pair of vertically spaced, horizontal conduits, 2 and 3, for indicating the liquid level or interface 5, between the fluids. Conduit 2 is connected to tank 4 above the liquid level 5; whereas, the connection of the lower conduit, 3, is below it. An inlet conduit 7 and outlet 9 are also connected to tank 4 for charging and discharging it.

Gauge 10 has an obround body 12, rectangular with rounded ends, which is mounted with its longitudinal axis vertically. There is a cavity defining a cylinder 14 in its front face which is communicatively connected to conduits 2 and 3 through apertures, 16 and 16, in its back wall 18. A flange 20, an extension of back wall 18, surrounds the body 12.

Enclosing the front of the body 12 is a cup-like cover 24, having a viewing slit 26 along its longitudinal axis and a rim 28. The ends of rim 28 seat on the front face of body-flange 20. Bolts 30, carrying nuts 32, extend through rim 28 and body-flange 20 and clamp the cover 24 to gauge body 12. Within the gauge, cover 24 is spaced from the end face 34 of body 12 so as to form a chamber 37 between them.

A transparent member 38, rectangular in shape and preferably glass, carried within chamber 37, covers slit 26. A fibrous cushion 40, for instance, of asbestos material, is between the glass 38 and cover 24; this furnishes a means of venting the area within the cover. Additional vents, holes 41, penetrate the cover, above and below the slit 26, to assure venting.

Transparent member or glass 38 is held in position, against cover 24, by the force of the fluid in tank 4. The force is transmitted to the glass through a piston 42 mounted for reciprocable movement in body-cylinder 14 under the fluid pressure entering the cylinder at the back of the piston through apertures 16 and 16. Piston 42 conforms closely to the configuration of the cylinder and carries a pressure packing 44, preferably an O-ring, in a peripheral groove 45 in its side walls to furnish a seal between it and the cylinder wall. There is a longitudinal groove 46 in the front face of piston 42 connected to the fluid behind it by a number of spaced apertures 48 through it. The fluid collecting in groove 46 corresponds to the level 5 in tank 4. A gasket 50 is interposed between piston 42 and glass 38 around groove 46 as a seal. The pressure applied through the piston 42 on gasket 50, it will be observed, is transverse to its long axis and tends to flatten the gasket; consequently, the sealing effect is increased.

In order to keep piston 42 spaced from the bottom of cylinder 14, a stop flange 52 extends transversely from it that seats on the end face of body 12. An oval-like spring 54, bent transverse to its longitudinal axis into an undulating form is disposed between the stop flange 52 and the body which urges the piston 42 forward and thereby keeps it in contact with glass 38. A flange 56 projects forwardly from stop flange 52; this encases glass 38 and maintains the desired position of the glass. The forwardly extent of encasing-flange 56 is such that its front face will not contact cover 24 regardless of the movement of piston 42.

In operation, fluid enters gauge body 12 through conduits 2 and 3 behind piston 42; some of the fluid passes through apertures 48 and fills groove 46 behind glass 38. The level of the fluid in groove 46 is observable through the slit 26 in cover 24. The pressure of the fluid at the back of piston 42 moves it forwardly and increases the sealing effect of gasket 50 as heretofore explained. In the absence of fluid pressure, the spring 54 urges glass 38 and piston 42 together and keeps them in proper position. The pressure gasket 44 in the peripheral surface of piston 42 is also subjected to the fluid pressure. Its effect is to force the pressure gasket in a forward direction, toward the glass 38, thereby expanding it laterally as with respect to the direction of the fluid. The pressure gasket 44 is thus crowded into the joint between the piston 42 and the wall of cylinder 14 and has its effectiveness increased.

From the foregoing it is apparent that bolts 30, securing cover 24 to gauge body 12, have little or no effect on the seals within the gauge and the need for constant monitoring of their tightness is eliminated.

In FIG. 4, a modification of the invention is shown. A number of parts are similar to the embodiment previously described, therefore, the same reference characters have been retained and the description now offered pertains only to the differences. In this embodiment, the use of the piston 42 and the seal it effects on gasket 50 to confine the fluid column showing the liquid level is eliminated. The pressure gasket 44 and its influence in producing a seal regardless of the tightness of the bolts 30 securing cover 24 to gauge body 12 is solely relied upon.

In detail, gauge body 12 has a frontal cavity or cylinder 14 as in the previous embodiment. Additionally, it has a longitudinal groove 58 in the bottom wall of cylinder 14 that is connected for receiving fluid through apertures 59, which are adapted for connection to conduits from a fluid carrying tank. Groove 58 contains the fluid which shows the fluid level. Gauge glass 38 is constructed to closely fit within cylinder 14 and allows vision of the fluid level in groove 58. A spring 60 is disposed between glass 38 and the bottom of cylinder 14 that urges glass 38 forwardly against a cushion 62 within cover 24 and surrounding viewing slit 26.

Within the side wall defining cylinder 14, there is a continuous circumferential groove 64 carrying the pressure gasket 44. In FIG. 4, gasket 44 is in the form of an O-ring and functions in the manner previously described with respect to the embodiment of FIG. 2. However, a gasket U-shaped in cross-section may be used. The latter is shown in FIG. 5 having lateral lips 65 and 66 joined by a web 68. The lips 65 and 66 are pointed toward the back of the gauge so that fluid pressure enters between the lips and forces them apart into contact with the sidewalls of viewing glass 38 and the bottom of groove 64.

This embodiment avoids the need of maintaining the bolts 30, securing the cover to the body, perfectly tight, since glass 38 is capable of movement piston-fashion without the seal formed by pressure gasket 44 being broken. Consequently, within limits, regardless of the imperfection of the joint between the cover 24 and gauge body 12, leakage is avoided by pressure gasket 44. Very loose bolts would permit glass 38 to move forwardly an increased distance until it is stopped by the cover 24, but as long as pressure gasket 44 contacts the sidewall of glass 38 and the wall defining the bottom of groove 64, the proper seal is retained.

From the foregoing it is apparent that many forms of the invention other than those given herein by way of illustration are possible, and that the scope of the invention is not limited to these examples, but only as set forth in the following claims.

Having thus described the invention, what is claimed is:

1. A high-pressure liquid level gauge, comprising a body having a cavity opening to the front thereof, for receiving the liquid to be measured, a piston disposed for movement in said cavity, a pressure responsive gasket disposed between the side walls defining said cavity and said piston adapted to permit movement of said piston and effecting an increased seal with increase of liquid pressure in said body, said piston having a liquid indicating slot in the front face thereof communicatively connected to said cavity, a transparent member covering said liquid indicating slot, a gasket interposed between said piston and said transparent member, and a cover enclosing the front of said body and secured thereto having a slot therethrough for viewing the liquid level in said indicating slot, said transparent member being adapted to bear against said cover over said viewing slot.

2. The gauge of claim 1 including stop means extending from the sides of said piston adapted to seat on the front of said body and prevent seating of said piston on the bottom of said cavity.

3. The gauge of claim 2 including resilient means disposed between said stop means and said body urging said piston and transparent member into contact with said cover.

4. The gauge of claim 3 including means extending forwardly from said stop means for retaining said transparent member in a desired position.

5. The gauge of claim 1 wherein the sidewalls of said piston is provided with a peripheral groove and said pressure responsive gasket is in the form of an O-ring seated in said groove.

6. The gauge of claim 1 wherein said transparent member is a glass plate.

References Cited by the Examiner
UNITED STATES PATENTS

| | | | |
|---|---|---|---|
| 754,034 | 3/04 | Zoanetto | 73—330 |
| 1,183,872 | 5/16 | Groff | 73—330 |
| 1,199,006 | 9/16 | Groff | 73—330 |
| 2,681,034 | 6/54 | Mannion | 73—334 X |
| 3,014,981 | 12/61 | Appl | 73—331 X |

ISAAC LISANN, *Primary Examiner.*